Figure 1:
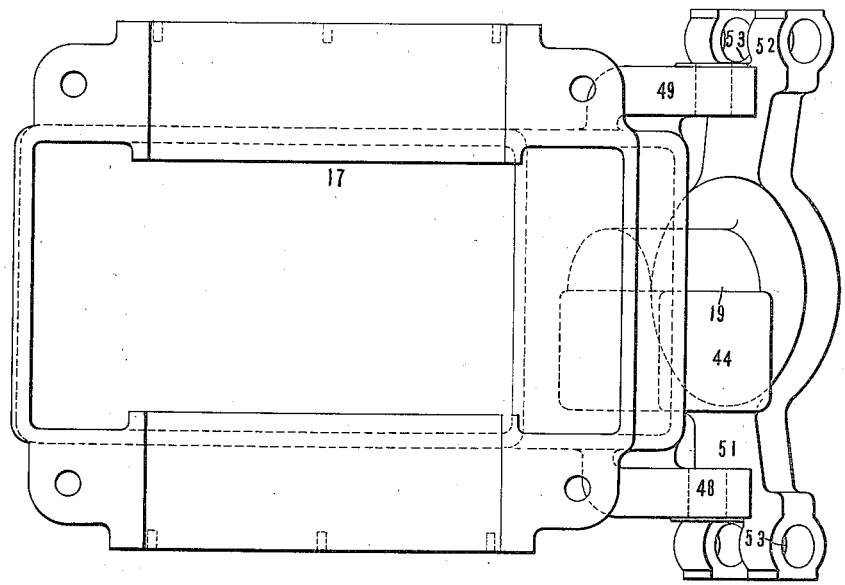

R. M. DIXON.
SHAFT DRIVE.
APPLICATION FILED DEC. 15, 1911.

1,164,933.

Patented Dec. 21, 1915.
7 SHEETS—SHEET 1.

WITNESSES

INVENTOR
R. M. Dixon
BY
Dull, Warfield & Dull
ATTORNEYS

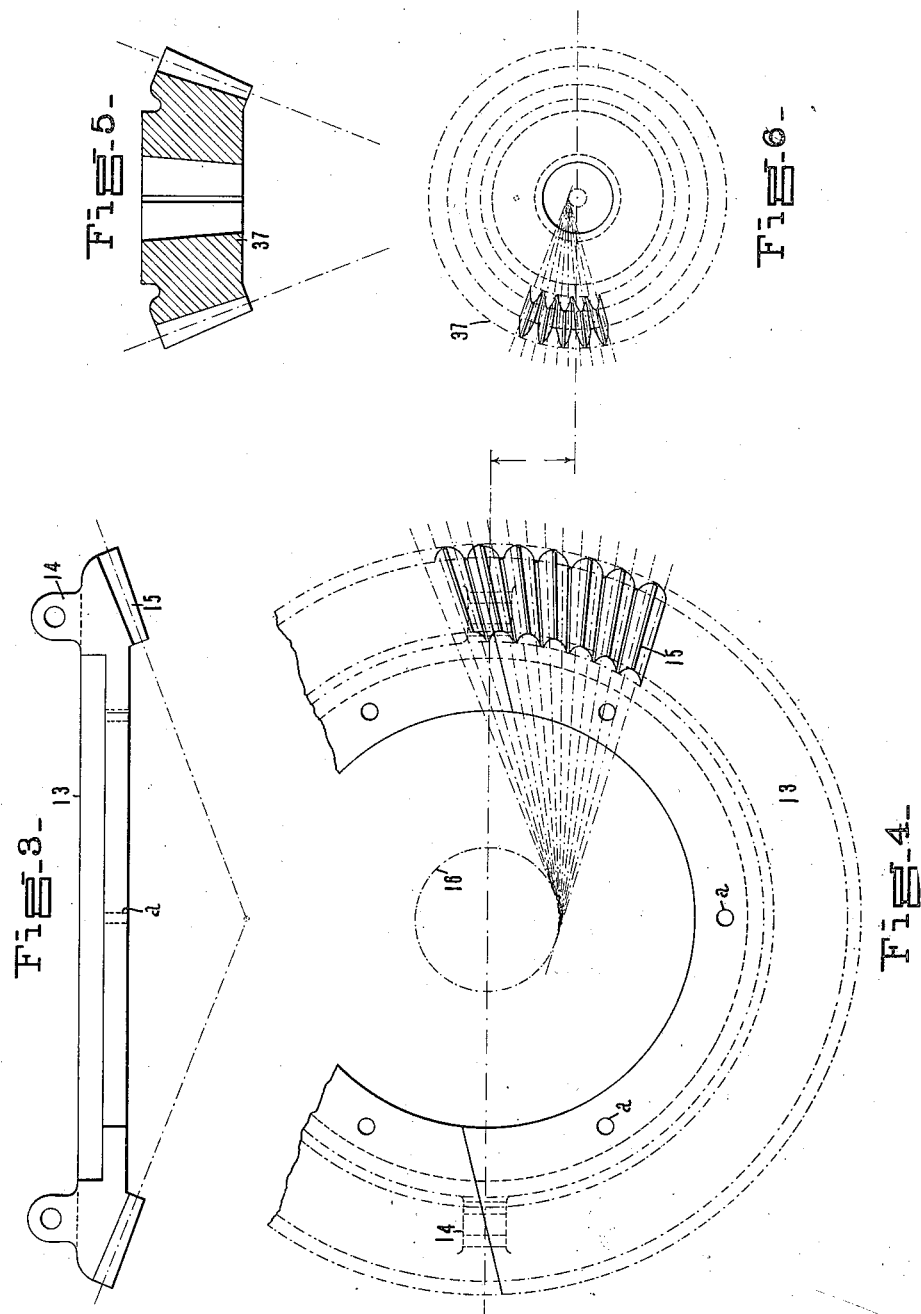

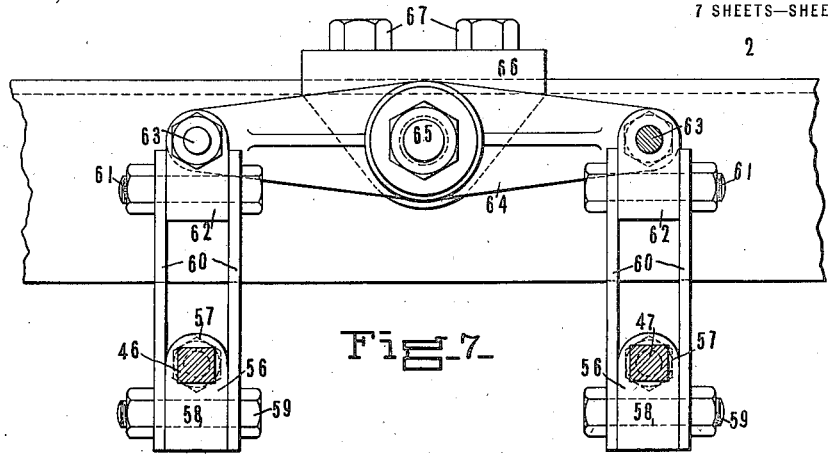
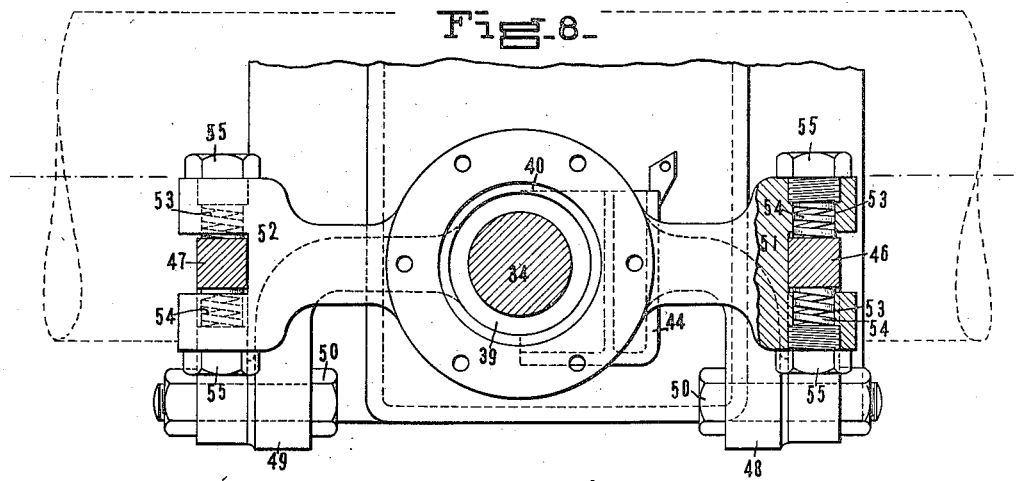
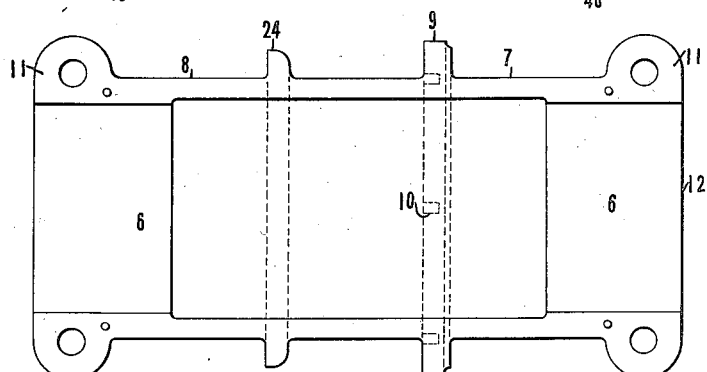

R. M. DIXON.
SHAFT DRIVE.
APPLICATION FILED DEC. 15, 1911.

1,164,933.

Patented Dec. 21, 1915.
7 SHEETS—SHEET 4.

WITNESSES

INVENTOR
R. M. Dixon,
BY
ATTORNEYS

R. M. DIXON.
SHAFT DRIVE.
APPLICATION FILED DEC. 15, 1911.
1,164,933.
Patented Dec. 21, 1915.
7 SHEETS—SHEET 5.
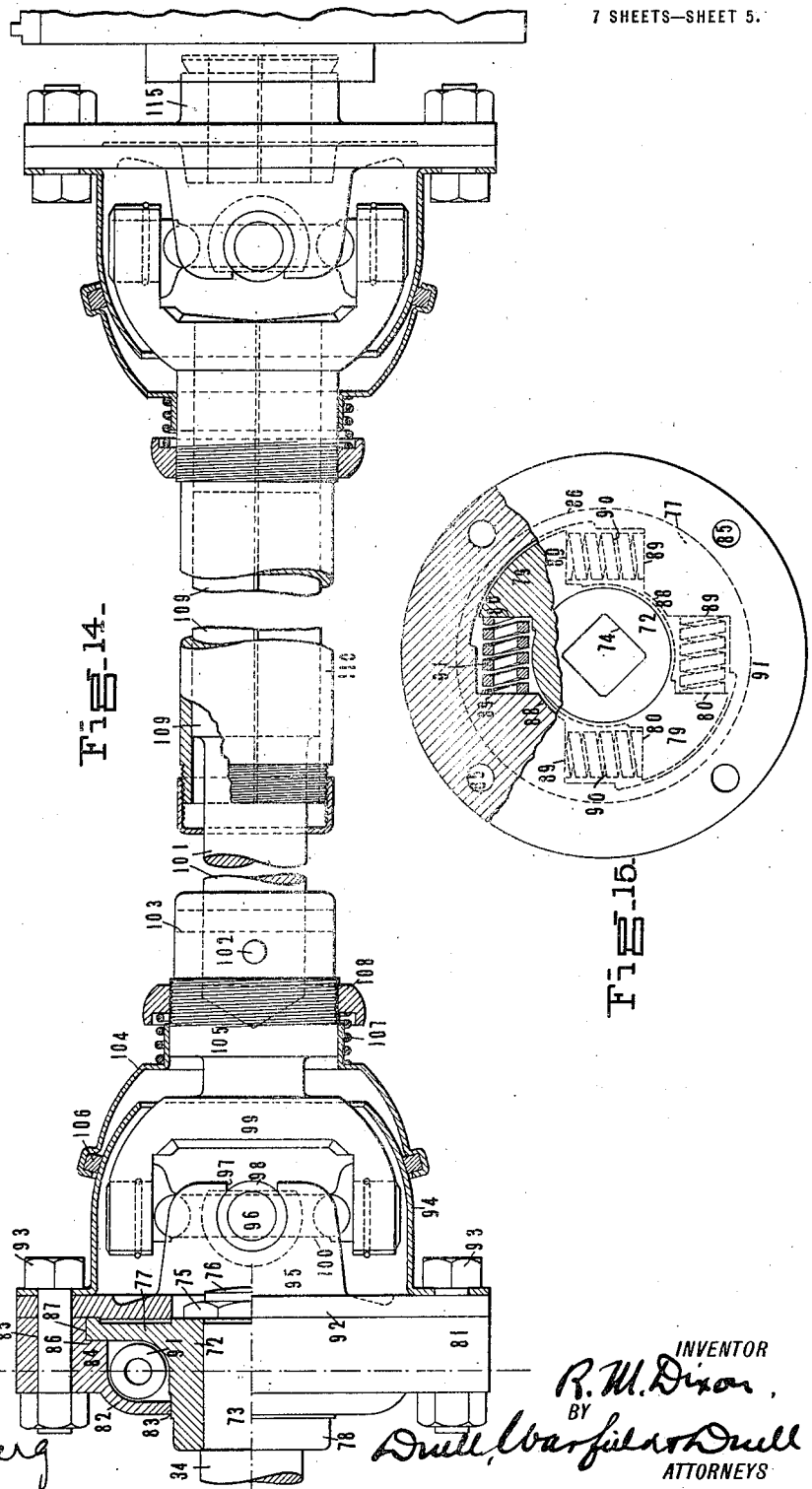
WITNESSES
INVENTOR
R. M. Dixon,
BY
Drull, Warfield & Drull
ATTORNEYS

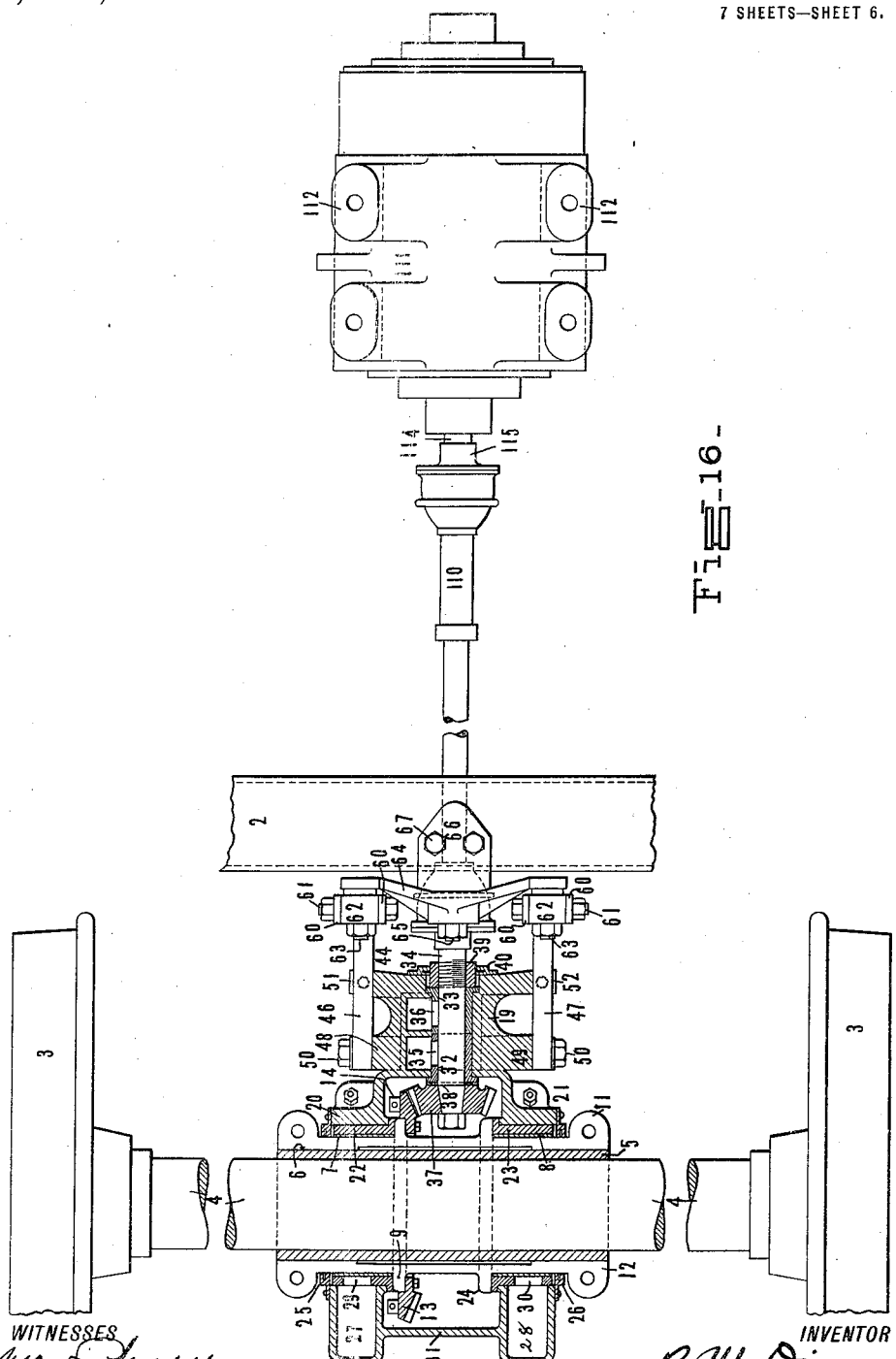

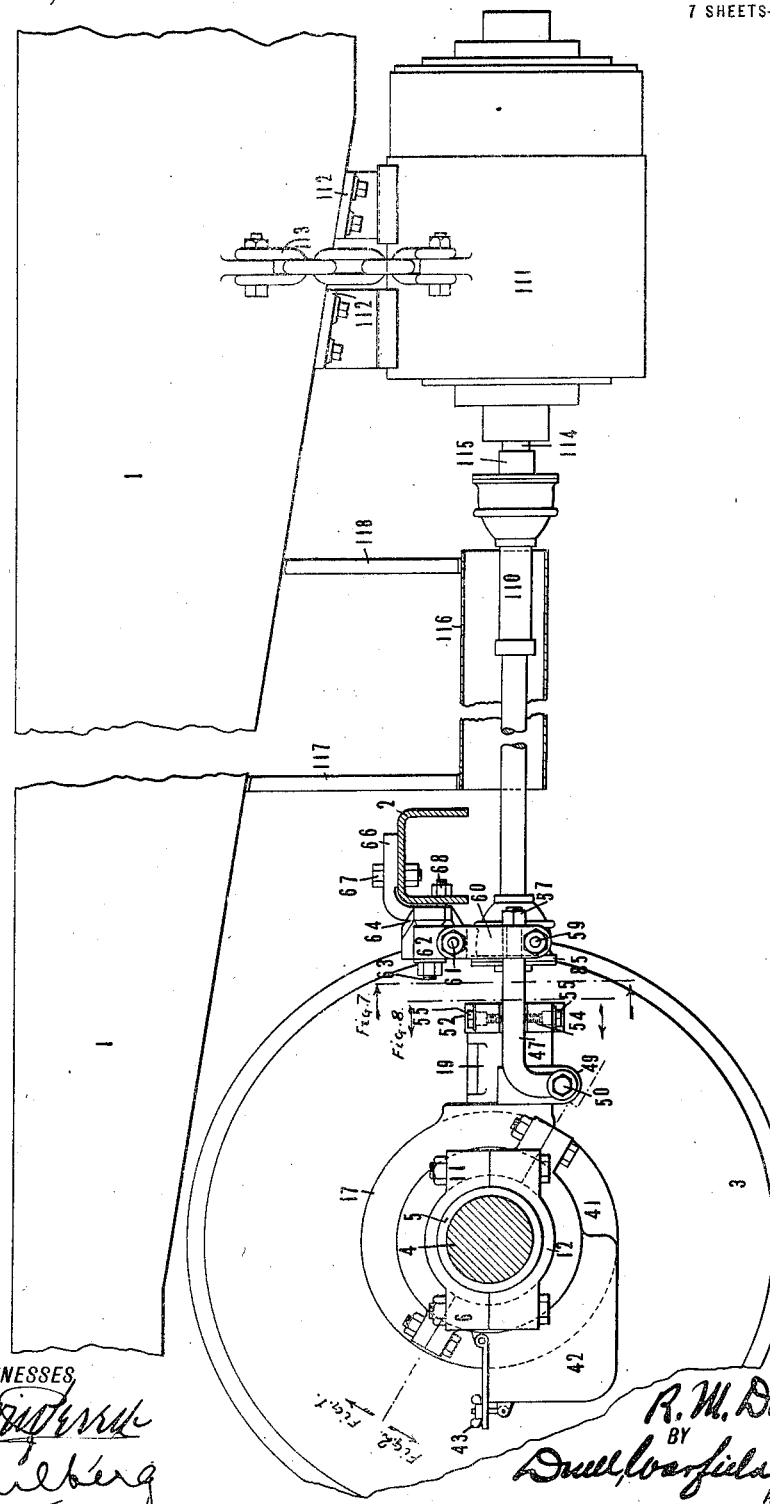

UNITED STATES PATENT OFFICE.

ROBERT M. DIXON, OF EAST ORANGE, NEW JERSEY, ASSIGNOR TO SAFETY CAR HEATING & LIGHTING COMPANY, A CORPORATION OF NEW JERSEY.

SHAFT-DRIVE.

1,164,933.  Specification of Letters Patent.  Patented Dec. 21, 1915.

Application filed December 15, 1911. Serial No. 666,033.

*To all whom it may concern:*

Be it known that I, ROBERT M. DIXON, a citizen of the United States, residing at East Orange, in the county of Essex and State of New Jersey, have invented certain new and useful Improvements in Shaft-Drives, of which the following is a full, clear, and exact description, such as will enable others skilled in the art to which it appertains to make and use the same.

This invention relates to improvements in car electric-lighting systems and it deals with a combination embodying numerous improvements and special arrangements whereby the dynamo may be driven from one of the wheel axles by means of a "shaft drive" instrumentality adapted to meet in a thoroughly practicable manner the various severe conditions prevailing in car service.

One object within the contemplation of this invention is to provide a system in which the dynamo may be supported, preferably underneath the car floor, as directly from the car-body, and in which it is connected by a "shaft drive" (as distinguished from belts or the like), with the axle of one of the wheels mounted in the usual manner in a standard truck; the arrangement and construction being such that the axle is permitted to assume all the various lateral, transverse and angular positions common to ordinary usage without disturbing the functions and operative relationships of the elements constituting the shaft drive.

Another object is to provide an instrumentality of the specified nature for positively and effectively driving a dynamo from a wheel axle and yet which will embody means for relieving the dynamo from the effects of sundry violent shocks and concussions ordinarily obtaining in practice; which will accommodate movement of the shaft toward and away from the dynamo; which will permit vertical movement of the shaft with respect to the truck members; and which will provide for the various angular shiftings and twisting strains which would otherwise occur in the connections due to axle movements.

Another object pertaining to a more specific embodiment of this invention is to provide a thoroughly practical arrangement whereby the dynamo may be carried directly from the car-body and thus relieved from the truck or wheel vibrations, while at the same time driving it from a wheel axle.

In order that this invention may be more effectively disclosed whereby those skilled in this art may understand the various ways in which the same can be embodied in practice, drawings have been appended illustrating one of the many forms which this invention may assume, and in such drawings like characters of reference denote corresponding parts throughout all the views, of which—

Figure 2:
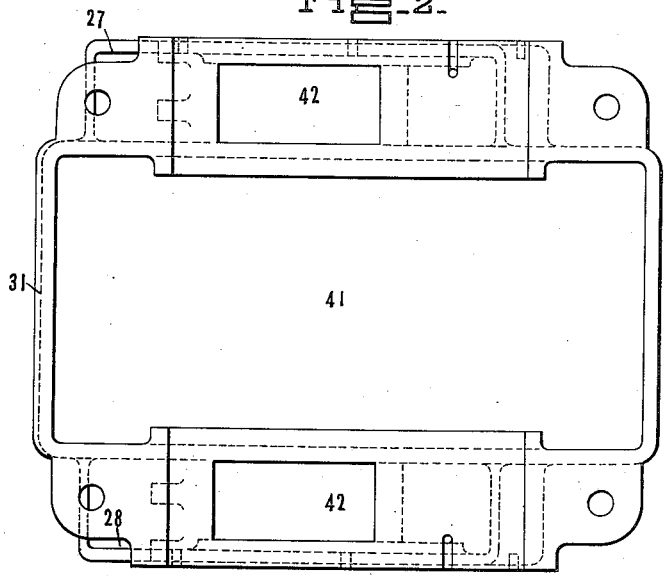
Figure 10:
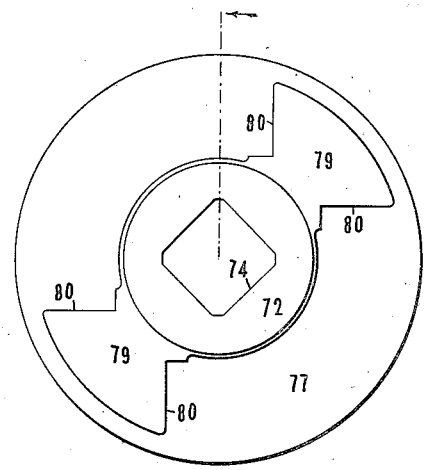
Figure 11:
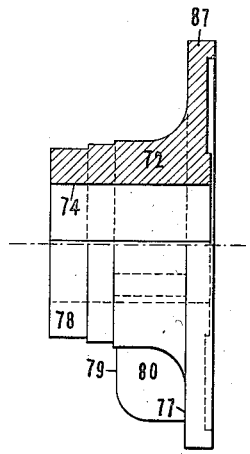
Figure 12:
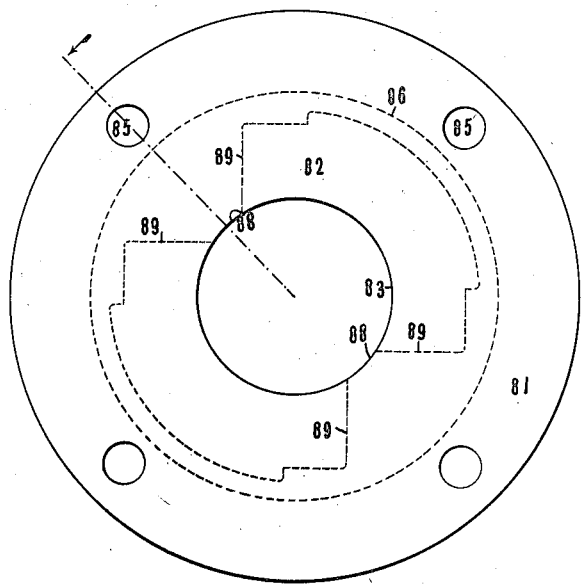
Figure 13:
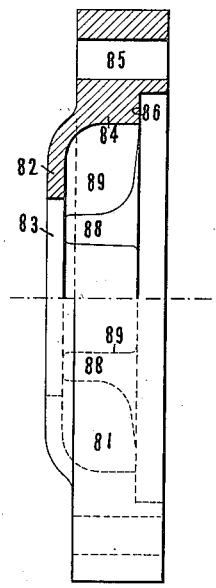

Figure 1 is a view looking upwardly into the upper section of the gear case, in the direction indicated by the arrow marked "Fig. 1" shown on Fig. 17; Fig. 2 is a view of the lower section of the gear case, looking downwardly into the same in the direction of the arrow marked "Fig. 2" shown on Fig. 17; Fig. 3 is a side elevation of one of the sections of the main driving "skew" bevel gear; Fig. 4 is a diagrammatic plan view of a portion of the main driving gear, depicting the layout of the same; Fig. 5 is a diametrical section through the driven pinion, which is also shown as a "skew" bevel gear; Fig. 6 is a partial plan view of the driven pinion diametrically illustrating the layout thereof; Fig. 7 is an end elevation looking (toward the dynamo) in the direction of the arrow marked "Fig. 7" appearing on Fig. 17 and illustrating the construction and arrangement of an equalizing mechanism typical of that proposed by this invention; Fig. 8 is an end elevation looking in the direction denoted by the arrow "Fig. 8" appearing on Fig. 17 (toward the gear case), and illustrating more clearly the arrangement of the links in the extension provided by the upper section of the gear case; Fig. 9 is a plan view of one section of a bearing sleeve such as may be mounted on the wheel axle to provide suitable journals for the gear case and parts thereof; Fig. 10 is an end elevation of one member of the power-transmitting "shock absorber" utilized as an element of this combination; Fig. 11 is a side elevation, partly in section, of the same; Fig. 12 is an end elevation of the coöperating member of said shock absorber; Fig. 13 is a side elevation, partly in section, of the last-mentioned member; Fig. 14 is a view illustrating in side elevation the assembled elements of a shock absorber combined with certain universal joints and extensible connections leading from the shaft of the driven pinion to the dynamo axle; Fig. 15 is an end elevation, partly in section, showing in assembly certain elements of the shock absorbing mechanism; Fig. 16 shows in plan view the general combination of this invention, and also shows in section certain details thereof; and Fig. 17 shows in side elevation the combination of parts and general arrangements of elements constituting this invention.

Continuing now by way of a more detailed description of the illustrated embodiment of this invention, 1 designates a side sill or element of the floor of the body of a car equipped with this invention. This car-body may be mounted in the usual manner on some standard type of wheel truck having an end member or beam such as indicated by 2. The usual car wheels are mounted in this truck, and one of these, the wheels indicated by 3 and their axle 4 will be utilized as a source of power for driving the dynamo.

It may be stated that one of the objects of this invention is to provide a structure capable of being applied to and arranged in operative combination with certain elements of rolling-stock in current usage, effectively and with despatch, and preferably without necessitating a removal of the trucks or wheels. Therefore, from one aspect, this invention proposes certain sub-combinations of elements which may be applied as attachments in a unitary manner, so to speak, to rolling-stock without dismantling the latter. Since the power is derived from a car wheel mounted on the usual wheel axle, it is desirable in any arrangement, and even essential in some, that certain of the working elements should be mounted as accurately concentric with the wheel axis as is practicable. While this invention promotes accuracy in this respect, it also provides an arrangement such that the axle may have considerable play relative to the dynamo, or even some eccentricity with respect to the gear case, without imposing strains on the drive shaft or deranging the mesh of the gears. Wheel axles are usually rather roughly finished, vary slightly in size, and after some service become more or less rusted. To enable elements of this invention to be connected therewith without removing the wheels, a suitable mold sleeve may first be clamped around the axle. This mold sleeve is exteriorly well finished to gage size, and when clamped in place so that its exterior periphery will be concentric with the wheel axis, fusible metal, such as babbitt, may be poured into the sleeve and allowed to harden, thus forming the Babbitt filler 5 having an exterior periphery of exactly the predetermined size and on which the regular sectional bearing sleeve subsequently may be clamped and thus securely and accurately positioned. One section of this bearing sleeve 12 is shown disassembled from other elements by Fig. 9, and, as will be seen from the drawings, the sleeve is diametrically split to enable it to be mounted on the Babbitt filler. The two halves of the same are clamped together and bored out so as to provide the bore-portions 6 which firmly engage the aforesaid Babbitt filler and serve to permanently secure the bearing sleeve in place so that the latter may form a journal for the gear casing and serve as a suitable support for the driving gear. It will be understood, since this fixture revolves constantly with the wheel, that ample bearing surfaces should be provided, and to that end, the peripheral portions 7 and 8 are provided as journals for the casing. These surfaces are finished smooth, and may be manufactured exactly to a standard diameter and thus any desired accuracy in workmanship and fitting of the bearing portions easily may be had when certain elements of this invention are applied to the axle. Somewhat at one side of the median line of this bearing sleeve is the peripheral flange 9 which is provided with a plurality of screw holes 10 for receiving the screws which secure the split driving gear in place after the bearing sleeve is assembled on the axle in the aforesaid manner. Preferably, at its ends, the sections of the bearing sleeve provide suitably perforated lugs 11 for the bolts which hold said sections together and these bolted ends may normally protrude from the gear casing which is to be assembled thereon.

The driving gear may be of any suitable type, such as the beveled gear indicated in the drawings by 13. By means of the bearing sleeve 12, it is mounted to turn with the wheel axle. To enable it conveniently to be assembled in place, it preferably has an annular form and is split into two parts, which are retained together by means of bolts passing through the apertured lugs 14, and preferably it is also secured to the flange 9 of the sleeve, as by means of a series of peripherally arranged machine screws which pass through apertures a in the sections of the driving gear and have a screw-threaded fit in the apertures 10, which are circumferentially equi-spaced in the peripheral flange 9. In a more specific aspect, this invention proposes a peculiar construction as to this beveled driving gear. Preliminary to a description thereof, it may be stated that certain advantages follow by positioning the shaft of the driven pinion, not on the same horizontal plane with the axis of the wheel axle, but appreciably below the same, as, for example, in the manner indicated by Figs. 8 and 17. This novel positioning of these elements provides considerable clearance for the shafting below the end beam 2 of the truck, which is of practical advantage in eliminating any possibility of damage, due to contact between such part and the portion of the driving shaft under an abnormal play between the truck and the wheels. Although the driven pinion is lowered in this manner, this invention obviates the necessity of having its axis extending radially from or about the center-line of the driving beveled gear, as is common in ordinary gearing, and this invention thereby makes provision whereby the pinion axis may be normally in alinement with the shafting extending to the dynamo, and thus avoids the excessive rocking movement of the universal joints which transmit power through more or less pronounced angles. The teeth 15 of the driving gear have, therefore, been given a special form in the preferred embodiment of this invention. That is to say, instead of using teeth which converge to a point located on the axis of the beveled gear, what is known as a "skew" gear is adopted in which the teeth are formed on tangents projected from a "gorge" circle, the radius of which is a factor of the amount the axis of the pinion is dropped below the axis of the driving gear. This gear construction is shown in detail by Figs. 3 to 6, inclusive, in which 16 denotes the gorge circle of the driving gear. Preferably, this gear is split on similar tangents extending from diametrically opposite points of the gorge circle in opposite directions. In this way the gear will be split on lines parallel to the teeth which may cut the gear between given pairs of teeth so as not to impair the strength of any of the teeth. It will be obvious that when the sections are brought together around the bearing sleeve 12 and secured thereto and to each other in the manner described, that the driving gear will for all practical purposes constitute a solid gear.

Since the gears will run almost continuously, and, ordinarily, under comparatively hard service, this invention provides means for protecting them against dust and grit and for keeping them in a state of ample lubrication. To that end, a sectional gear casing encompasses the gears, provides oil-wells for maintaining the lubrication thereof, and also furnishes a mounting for keeping the driven pinion in proper mesh with the driving gear. This gear casing may be made up of sections so that it may be assembled on the wheel axle. The upper of these sections 17 is shown in detail by Figs. 1 and 16, and provides an axle circumscribing portion, and, preferably integral therewith, an arm or extension 19. The latter provides for a horizontal arrangement of the stub shaft of the pinion and also is connected with certain features which resiliently oppose any undue turning of the gear casing about the wheel axle. The circumscribing portion of the gear casing provides two annular portions 20 and 21 which are adapted to carry the brasses 22 and 23, which are preferably faced with babbitt which is accurately fitted to the corresponding journals of the bearing sleeve. The peripheral flange 9, coacting through the brass 22, prevents displacement of the casing in one direction and the peripheral flange 24 of the sleeve has a corresponding effect as to the opposite direction. The exposed ends of the portions 20 and 21 of the gear case carry suitable oil-retaining rings 25 and 26, respectively, the purpose of which will be understood. Interiorly, the gear casing may provide oil-chambers 27 and 28 whereby oil may reach the journals through the openings 29 and 30 in the brasses, and a central annular chamber 31 will receive the driving gear 13, and at one end also provide room for the driven pinion. The arm 19 extending from the upper circumscribing section 17 has a horizontal bore in which may be fitted the two tubular brasses 32 and 33 which form a bearing for the stub shaft 34. One or more chambers or oil-wells, such as 35, may also be provided in this arm or extension 19, so that oil may enter the bearing surfaces through an opening such as 36 in the brasses.

On the inner end of the stub shaft 34, the pinion 37 is secured in a suitable manner, as by means of the illustrated taper joint, and it is adjusted as to its outward position by means of suitable liners 38 interposed between the pinion and the brass 32, and its inner position is determined by the adjusting nut 39 which is screw-threaded to an opposite portion of the stub shaft, as indicated on the drawings. Suitable oil-retaining rings 40 serve to prevent undue loss of oil.

The gear casing is shown diametrically split along a line extending from a point below the arm or extension 19 (thereby enabling the latter to be integrally and thus very strongly attached to the circumscribing portion), and this split-line extends diametrically upward in an inclined direction through the center-line of the gear casing, thereby enabling the two halves thereof to be assembled around the bearing sleeve. By this method of construction, the driven parts and the various connections are carried by a strong casing portion which is in turn supported by the underlying elements secured to the axle, so that, even should the casing sections separate, the gearing and parts would still be supported by the wheel axle and would not fall to the ground. The under section 41 of the gear casing may be furnished with one or more openings to the oil-wells, which is normally closed by a cover plate 43, so that the latter may be filled whenever desired. In like manner, the extension 18 from the upper section may provide the oil-well 44, to which access may also be had by means of the cover plate 45.

It will be understood that since the pinion 37 has its shaft supported in the arm or extension 19, a revolution of the wheel axle will, through the gear 13, tend to produce a corresponding revolution of the gear casing. This invention proposes to resiliently resist this action by interposing a toggle between the end member 2 of the wheel-truck and the wheel axle, preferably, as here shown, making the gear casing act as one element of the toggle and for the other element, utilizing links 46 and 47. Each of these links is shown pivoted at one end to a suitable portion of the gear casing, as at a point above or below the center-line of the pinion-shaft, and at its other end, each is flexibly supported as from the truck-member 2. Provision is made for restricting the movement of these links about their pivots on the gear casing. Preferably, these links are made L-shaped, as shown by the drawings, and pivoted at the extremities of their shorter branches or feet to portions 48 and 49, extending in the form of downturned lugs, as by means of bolts 50 which pass through apertures in the lower end of these lugs and constitute the pivots for the said links. At a suitable distance, preferably in advance of the pivots, the arm or extension 19 provides, on each side thereof, bifurcated lugs 51 and 52, between the fingers of which pass portions of the links 46 and 47. The fingers of these bifurcated lugs are spaced sufficiently to enable the links to swing a slight distance from the one to the other, but this movement is resisted in a resilient manner by suitable springs which act as shock-absorbers and also serve to normally position the links midway of these fingers. This construction is carried out in accordance with the present invention in a simple and effective manner, permitting a very durable adjustment in the parts. To that end, the fingers of the bifurcated lugs 51 and 52 are bored clear through, thus providing apertures 53, into which are inserted springs 54. The outer end of these apertures are tapped and bolts 55 enter the same and suitably compress the springs 54. To prevent rotation of the gear-case, a means is provided whereby these links 46 and 47 may be supported at points remote from their aforesaid pivotal points, and preferably the above described resilient arrangement operates on said links between their pivotal points and the said supporting points, as, for example, in the manner shown by the drawings. In this case, the links extend forwardly and terminate below an equalizer mechanism which is preferably attached to the end member 2 of the truck, the arrangement being such that provision is made for such movements of the links as will obtain in use. By reason of this construction, the links, considered individually or as a pair, may be said to constitute one member of a toggle supported at one end by the end member 2 of the truck, and the gear case, in like manner, serves as the other member of said toggle, and the aforesaid resilient means constitutes an instrumentality for elastically opposing movements between the members of said toggle. This utilization of the toggle principle is advantageous in respect to providing for the slight necessary play in different directions of the apparatus, while yet precluding undue rotation of the case, and the arrangement exemplified is especially noteworthy for its practical utilities. The means for supporting the ends of the links preferably comprises an equalizer, and while the construction may assume various forms within the scope of this invention, that illustrated by the drawings will be found effective and essentially practical. Adjacent their extremities, the links are rounded and pass through apertures in blocks 56, as shown more clearly in Fig. 7, being retained against end movement as by means of nuts 57 tapped onto the protruding extremities of such links. These blocks 57 provide apertures 58, extending transversely to those aforesaid, and carry bolts 59 which serve as pivot pins for links 60, which preferably rise from each side of the blocks 56 and extend upwardly into connection with bolts 61, which pass through upper blocks 62 in a manner similar to that before described. These upper blocks 62 are also provided with transverse apertures through which pass studs 63, extending laterally from the extremities of a balance or equalizing arm 64. This yoke or balance arm 64 is apertured, preferably equi-distant between the studs 63, and receives the pivot pin 65 which projects horizontally from a base plate 66, which is rigidly secured to the end member 2 of the truck as by means of the vertical bolts 67 and the horizontal bolt 68.

By this equalizing suspension, it will be perceived that play of the parts in the various different directions is amply taken care of by means of an essentially practical construction. For example, should the end member 2 of the truck be jolted upwardly or downwardly relatively to the wheel axle 4, or conversely, the gear-case will be relieved from the suddenness of the movement by the capacity possessed by the links 46 and 47 of turning slightly about their pivots against a yielding resistance. In like manner, should the truck member 2 tend to assume a slight angular relation in the horizontal plane with the wheel axle 4, or conversely, the straps 60, connected with the ends of the links 46 and 47, will move in directions accommodating this shift of parts. In like manner, should the truck member 2 tend to swing at an angle in the vertical transverse plane relative to the wheel axle 4, or conversely, the equalizer or yoke 64, together with the straps 60 and connecting blocks, will effectively provide for such movement. Furthermore, should the truck member 2 tend to assume a position nearer the wheel axle 4, or conversely, the straps 60, together with the blocks 56 and 62, will also provide for the same. Other relative movements and combinations thereof will also be permitted by the resultant or compound relative movements between the respective parts, so that altogether, the apparatus is essentially characterized by a capacity for meeting and providing for all the slight relative movements which will unavoidably obtain in the use of this apparatus. The position of the gearcase is thus assured within practical limits and the employment of a shaft drive mechanism in connection therewith is rendered feasible, especially by reason of certain further improvements which may now be described.

The stub-shaft 34 of the pinion 37 is connected at its end with a shock-absorbing device adapted to continuously transmit rotary power. To enable the utility of this combination to be understood, it may be noted that at times the car-wheel may be very abruptly started, stopped or altered with respect to its rotation or rate of rotation, as the case may be. This may occur, for example, as when the train is being started or during the operation of coupling the various cars together. To relieve the gears from any undue violence in this respect, this invention proposes the insertion of what may be termed a "rotary shock-absorber", either between a gear and the source of movement, or between a gear and the application of power, i. e., the part to be driven, as, for example, by inserting such a means between the pinion 37 and the universal shaft leading to the dynamo, as shown by Fig. 14 of the drawings. Mounted on this shaft and actuated thereby is the element 72 which is here shown as circular in form and provided with certain wings or abutments which support certain resilient power-transmitting devices. This element 72 may, of course, be mounted on the driving shaft 34 in any suitable manner, as, for example, by terminating the latter in a squared end, designated by 73, and providing the element 72 with a squared aperture 74 closely fitting the same. A nut 75 may be mounted on the screw-threaded stub 76 projecting from the end of the driving shaft and utilized to lock parts 34 and 72 against transverse movement. The element 72 preferably provides a disk-like face plate 77, from which projects the hub portion 78. This element 72 also provides wings 79 located preferably on opposite sides of the hub portion 78, which wings form abutments for the series of springs which transmit the power from the element 72 to the second element to be hereinafter described. In the preferred form of this invention, coiled springs 80 of the compression type are used, and to better accommodate a chordal or tangential, as distinguished from a radial, arrangement of these springs, the side faces of the wings are disposed in a chordal or tangential direction, as indicated by 80, 80, thus imparting a sector-like shape to the wings 79. The second-mentioned element, shown isolated and in detail by Figs. 12 and 13 and indicated by the reference character 81, is connected with some other part, which is preferably arranged coaxially with the power-driven shaft and which, in this instance, is a part of a universal joint on a driven shaft, and preferably is so fashioned as to have a bearing on the periphery of the face plate 77 of the driving element 72; as well as to provide suitable seats for the power-transmitting springs, and at the same time house the latter. To that end, in the shown embodiment of this invention the driven element 81 provides an annular portion 82 resembling an inturned flange having an aperture 83 which circumscribes and preferably has a bearing on a portion of the hub 78 of the driving element 72. This flange portion extends from an annular body portion 84 provided with circumferentially spaced bolt-apertures 85 and also with an annular recess 86, within which the rim 87 of the driving element 72 may have a bearing. It will be perceived that in this manner the driving and driven elements 72 and 77 telescope to a certain extent and have two circumferential bearing portions spaced apart so as to provide pockets for the springs.

By turning to Figs. 12 and 15, it will be perceived that the driving element 77 provides sector-shaped ribs 88 having spring-supporting faces 89 which are spaced apart from and are normally substantially parallel with the faces 80 on the other element. This is shown more clearly by Fig. 15. In this way a plurality of spring pockets, disposed in the direction of a chord or tangent, are provided, in this instance, four being used, and equi-spaced, as shown. Within these pockets suitable expansile springs 90 and 91 are arranged, preferably equi-spaced and each at right angles to others which act in opposition. These springs are normally each under considerable compression, and it will be noted that the springs 90 tend to produce a similarly directed relative movement between the elements 72 and 81, which, however, is opposed and normally balanced by the springs 91, each of which acts in an opposite direction. By reason of this construction, an abrupt application of power in either direction of rotation is enabled to produce a slight relative rotation between the said two elements, which, however, will, without undue shock, be quickly diminished and counterbalanced by the opposition of either one or more of the other springs, or sets of springs, as the case may be. It will be noted that the power transmission will therefore be positive in effect, though capable of equalizing irregularities due to shocks and concussions, and that the device will act effectively as a so-called shock absorber.

While the driven element 81 may be secured to the driven part in any suitable manner, within its more specific aspect, this invention proposes to connect and combine it with a flexible joint, as by means of a flange member 92 which is circumferentially provided with apertures corresponding to the apertures 85 of the driven member and is connected to the latter by means of bolts 93. The latter may also secure the casing shell 94 which may inclose a universal joint on the driven shaft. While the flange coupling 92 may be secured directly to a driven shaft, it is here shown as constituting an element of a universal joint, thus forming a combination capable of reducing strains in the parts, as well as irregularities in the power.

It is to be noted that the general relationship of parts shown by Figs. 16 and 17 is such that a universal joint such as that above mentioned is provided in the transmission at a point adjacent or in the vertical transverse plane of the equalizing suspension mechanism described in the foregoing. By this arrangement this invention seeks to place the flexible joint practically at a center of movement of the parts, so that the transmission of power through the flexible joint will be more direct and so that the angular movements in the latter will be reduced to a minimum. To that end the flexible joint shown at the left hand end of the transmission illustrated by Fig. 14 will be arranged more or less directly underneath the equalizing mechanism carried by the end member 2 of the truck. This flexible joint may be of a conventional pattern, as, for instance, it may constitute the universal joint shown in detail more clearly by Fig. 14, in which the part 92 provides a U-shaped extension having side lugs, such as 95, each of which supports corresponding ends of a cross arm 96 of an intervening suitably shaped dog. To facilitate the assembly of these parts the lugs 95 may provide openings 97 sufficient to permit the entry of the arms 96, and a bushing 98 may then be slipped in place to retain the parts in position. A corresponding U-shaped member 99 in a suitable manner may engage the cross ends of the arm 100 of said power-transmitting dog, and the part 99 may be attached to the section 101 of the transmission shaft, as by means of the pins 102 and 103. To exclude the entry of dust, a cup-shaped cover 104 may be slidably mounted on the part 105 of the member 99 and may have its annular packing ring 106 spring-pressed into contact with the part 94 by means of the spring 107. A nut 108 may be used to regulate the compression of the spring 107 and to permit the withdrawal of the cover 104 for purposes of repair or inspection.

The driving shaft is formed in two sections which telescope to permit elongation in the direction of the axis, but means is also provided whereby relative rotation of such parts is prevented. For example, the section 101 of the driving shaft may have a squared end 109 which telescopes within the squared bore of the section 110, so that while it may freely slide in an axial direction, it may not turn in the same. The section 110 is connected at its other end with a flexible or universal joint, which in this instance being similar in construction to that already disclosed, need not be further described.

The dynamo is represented by 111 and is attached in a suitable manner to the car-body, preferably underneath the same between the trucks thereof, as by being secured to the truss members 1, as shown more clearly by Fig. 17. For this purpose suitable lugs such as 112 may be employed, and to prevent accident in case the latter should in any manner break or work loose, safety chains 113 may also be utilized. The armature axle 114 may be secured to the adjacent member of the universal joint on the shaft section 110 in any suitable manner, as by means of the flange 115. As a precaution against accident in case the transmission shaft or its parts should become disassembled or broken, a tubular sleeve 116 may be suspended by the straps 117 and 118, so as to circumscribe the transmission shaft and prevent the parts thereof from falling.

From the foregoing it will be perceived that the aforesaid objects are all attained and that this invention provides a very complete organization of elements whereby a dynamo may be very effectively driven from a wheel axle by a construction such that the parts may be assembled without dismantling the car and at the same time form a thoroughly serviceable and practical arrangement.

Without further elaboration, and in the light of current knowledge, the foregoing disclosure will suffice to enable those skilled in this art readily to utilize various interchangeably available and mechanically equivalent structures which, although perhaps calculated to appear more or less different in one or more respects, and perhaps embodying an arrangement of certain parts somewhat dissimilar from that herein shown, would nevertheless appropriate certain, if not all, of those features which, from the aspect of the prior art, will be seen to constitute essential and advantageous characteristics of this invention, and therefore such structures or sub-combinations should and accordingly are intended to be comprehended within the wording and range of equivalency of the following claims.

Having described my invention, what I claim as new and desire to secure by Letters Patent is:—

1. An axle driven car lighting system, combining a car body, a truck for supporting the same, a wheel in said truck, a dynamo carried by said car body, and a shaft-drive instrumentality connected with the axle of the wheel and extending underneath the end member of said truck to a driving connection with the armature, the driving and driven members of said instrumentality rotating at a substantially uniform ratio of instantaneous angular speed.

2. An axle driven car lighting system, combining a car body, a truck for supporting the same, a wheel in said truck, a dynamo carried by said car body, a shaft-drive instrumentality connected with the axle of the wheel and extending underneath the end member of said truck to a driving connection with the armature and adapted to effect a constant angular speed of the dynamo when the car speed is constant, and means carried by said end member for supporting the underlying shaft-drive instrumentality.

3. An axle driven car lighting system, combining a car body, supporting wheels therefor, a dynamo positioned underneath said car body and having the driven end of its armature shaft positioned below the plane of a wheel axis, and driving means comprising bevel gearing and a shaft extending from the axle of said wheel and having a driving connection with said end of said armature shaft.

4. An axle driven car lighting system, combining a car body, supporting wheels therefor, a driving bevel gear mounted on the axle of one of said wheels, a driven bevel gear having its axis below the axis of said wheel, a dynamo carried by said car body, and driving connections between said driven gear and said dynamo.

5. An axle driven car lighting system, combining a car body, supporting wheels therefor, a driving bevel gear mounted on the axle of one of said wheels, a driven bevel gear having its axis arranged substantially horizontal and positioned below the axis of said wheel, a dynamo supported by said car body, and driving connections between said driven gear and said dynamo.

6. An axle driven car lighting system, combining a car body, supporting wheels therefor, a driving gear mounted on the axle of one of said wheels, a driven gear in mesh therewith, means for adjusting the mesh of said gears, a dynamo carried by said car body, and driving connections between said driven gear and said dynamo.

7. An axle driven car lighting system, combining a car body, supporting wheels therefor, a bevel driving gear concentrically mounted on the axle of one of said wheels, a bevel driven gear having its axis extending below the axis of said wheel, the teeth of said driving gear being directed along tangents to a circle concentric with its center, a dynamo supported by said car body, and driving connections between said driven gear and said dynamo.

8. An axle driven car lighting system, combining a car body, supporting wheels therefor, a driving gear mounted on the axle of one of said wheels, a sectional gear case inclosing said driving gear, one of the sections of said gear case having an extension, a driven gear also inclosed by said case and having a shaft journaled in said extension, resilient connections between said extension and an end member of the truck frame for resisting rotation of said case, a dynamo, and driving connections between said shaft and dynamo.

9. An axle driven car lighting system, combining a car body, a truck, a wheel journaled in said truck, a driving gear on the axle of said wheel, a sectional gear case inclosing said driving gear, one of the sections of said gear case having a horizontally disposed extension, a link supported at one end from an end member of the truck frame and connected at its other end with said extension to form a toggle therewith, means for resiliently impeding the relative movement between the members of said toggle to prevent an undue rotation of said gear case, a driven gear journaled in a section of said gear case, a dynamo, and driving connections between said dynamo and said driven gear.

10. An axle driven car lighting system, combining a car body, a truck therefor having an end member, a wheel journaled in said truck, a driving gear on the axle of said wheel, a sectional gear case inclosing said driving gear, one of the sections of said gear case having a horizontally disposed extension, resilient connections between said extension and an end member of the truck frame for resisting rotation of said gear case, a driven gear having its shaft journaled in said extension, a dynamo, and driving connections between said shaft and said dynamo.

11. An axle driven car lighting system, combining a car body, a supporting wheel therefor, a gear case journaled on said axle, a driving gear secured to said axle within said case, a relatively stationary member, a resilient connection between said case and said relatively stationary member and embodying an element pivoted to said case, a dynamo, and driving connections between said driving gear and said dynamo.

12. An axle driven car lighting system, combining a car body, a supporting wheel, a gear case journaled on the axle of said wheel, a relatively stationary member, a link, a shackle between said member and one end of said link for yieldably supporting the latter, said link being connected with said gear case, means for resiliently opposing relative movement between said link and gear case, a dynamo, and driving connections extending from said axle through said gear case to said dynamo.

13. An axle driven car lighting system, combining a car body, a supporting wheel, a gear case journaled on the axle of said wheel, a relatively stationary member, an arm pivotally supported thereby, a link attached at one end to said gear case and connected at its other with said arm, means for resiliently opposing relative movement between said link and said gear case, a dynamo, and driving connections extending from said wheel axle through said gear case to said dynamo.

14. An axle driven car lighting system, combining a car body, a truck therefor, a wheel journaled in said truck, a driving gear on the axle of said wheel, a gear case inclosing said driving gear, a driven gear journaled in said case, a relatively stationary member, and connections comprising an equalizer extending from said member to said case for resisting rotation thereof.

15. An axle driven car lighting system, combining a car body, a truck therefor, a wheel journaled in said truck, a driving gear on the axle of said wheel, a gear case inclosing said driving gear, a driven gear journaled in said case, a relatively stationary member, a balance arm pivotally supported between its ends from said stationary member, and connections extending from each end of said arm to said case to resist rotation thereof while permitting slight relative movement.

16. An axle driven car lighting system, combining a car body, a truck therefor, a wheel journaled in said truck, a driving gear on the axle of said wheel, a gear case inclosing said driving gear, a driven gear journaled in said case, a relatively stationary member, and articulated means for supporting said case against rotation relative to said member, said means permitting relative movement between said member and said case in the direction of the axis of the driven gear.

17. An axle driven car lighting system, combining a car body, a truck therefor, a wheel journaled in said truck, a driving gear on the axle of said wheel, a gear case inclosing said driving gear, a driven gear journaled in said case, a relatively stationary member, and articulated means for supporting said case against rotation relative to said member, said means permitting relative movement between said member and said case in the direction of the wheel axis.

18. An axle driven car lighting system, combining a car body, a truck therefor, a wheel journaled in said truck, a driving gear on the axle of said wheel, a gear case inclosing said driving gear, a driven gear journaled in said case, a relatively stationary member, and means secured to and depending from said truck for supporting said case against rotation with said axle, said means permitting a slight angular swing between said gear case and said member about an axis parallel with that of the driven gear.

19. An axle driven car lighting system, combining a car body, a truck therefor, a wheel journaled in said truck, a driving gear on the axle of said wheel, a gear case inclosing said driving gear, a driven gear journaled in said case, a relatively stationary member, and means secured to and depending from said truck for supporting said case against rotation relative to said member, said means permitting a slight angular movement in an approximately horizontal plane between said case and said member.

20. An axle driven car lighting system, combining a car body, a truck therefor, a wheel journaled in said truck, a driving gear on the axle of said wheel, a gear case inclosing said driving gear, a driven gear journaled in said case, a relatively stationary member, and means secured to and depending from said truck for supporting said case against rotation relative to said member, said means permitting a slight relative movement between said case and said member in either of a plurality of different directions.

21. An axle driven car lighting system, combining a car body, a truck therefor, a wheel journaled in said truck, a driving gear on the axle of said wheel, a gear case inclosing said driving gear, a driven gear journaled in said case, a relatively stationary member, a part pivotally supported from said member, a link pivoted to said case, and a universal coupling between said link and part.

22. An axle driven car lighting system, combining a car body, a truck therefor, a wheel journaled in said truck, a driving gear on the axle of said wheel, a gear case inclosing said driving gear, a driven gear journaled in said case, a relatively stationary member, a link pivoted to said case below the plane of said member, and means supporting said link from said member at a point remote from its said pivot.

23. An axle driven car lighting system, combining a car body, a truck therefor, a wheel journaled in said truck, a driving gear on the axle of said wheel, a gear case inclosing said driving gear, a driven gear journaled in said case, a relatively stationary member, a link pivoted to said case at a point below the plane of said member, and universal connections supporting said link at a point remote from its said pivot from said member.

24. An axle driven car lighting system, combining a car body, a truck therefor, a wheel journaled in said truck, a driving gear on the axle of said wheel, a gear case inclosing said driving gear, a driven gear journaled in said case, a relatively stationary member, a balance arm pivotally supported at its center from said member, a link connected with each end of said arm and with said case, and means controlling relative movement between said links and said case.

25. An axle driven car lighting system, combining a car body, a truck therefor, a wheel journaled in said truck, a driving gear on the axle of said wheel, a gear case inclosing said driving gear, a driven gear journaled in said case, a relatively stationary member, a lever pivotally supported from said member, a link pivoted to said case below the plane of said support, said link extending underneath said lever, and depending connections between said lever and said link.

26. An axle driven car lighting system, combining a car body, a truck therefor, a wheel journaled in said truck, a driving gear on the axle of said wheel, a gear case inclosing said driving gear, a driven gear journaled in said case, a relatively stationary member, connections between said member and said case to resist rotation thereof, a dynamo, a shaft drive extending from the driven gear underneath said member to said dynamo, and a universal joint located in said shaft drive beneath the point of support of said connections on said member.

27. An axle driven car lighting system, combining a car body, a truck therefor, a wheel journaled in said truck, a driving gear on the axle of said wheel, a gear case inclosing said driving gear, a driven gear journaled in said case, a relatively stationary member, an equalizing instrumentality carried by said member and connected with said case, a dynamo, a shaft drive extending between said driven gear and said dynamo, and a universal joint in said shaft drive located adjacent the vertical transverse plane of said equalizing instrumentality.

28. An axle driven car lighting system, combining a car body, a truck therefor, a wheel journaled in said truck, a driving gear on the axle of said wheel, a gear case inclosing said driving gear, a driven gear journaled in said case, a relatively stationary member, a lever pivotally supported at its center from said member, connections depending from each end of said lever, a link extending from opposite sides of the driven gear shaft to said connections, a dynamo, a drive shaft extending from said driven gear shaft to said dynamo, and a universal joint located in said driven shaft at a point underlying the central pivot of said lever.

29. An axle driven car lighting system, combining a car body, supporting wheels therefor, a driving gear mounted on the axle of one of said wheels, a gear case inclosing said driving gear and comprising sections overlying and underlying said axle, the overlying section of said gear case having a horizontally disposed extension, a driven gear also inclosed by said case and having a shaft journaled in said extension, means connected with said extension for resiliently resisting rotation of said case, a dynamo, and driving means between said shaft and dynamo.

30. An axle driven car lighting system, combining a car body, supporting wheels therefor, a driving gear mounted on the axle of one of said wheels, a gear case inclosing said driving gear and divided along a plane inclining rearwardly and upwardly through said axle, the overlying section of said gear case having a portion extending forwardly and horizontally, a driven gear inclosed by said case and having a shaft journaled in said extension, means for resiliently resisting rotation of said gear case, a dynamo positioned forwardly thereof, and driving connections between said shaft and dynamo.

31. An axle driven car lighting system, combining a car body, a truck for supporting the same, a wheel in said truck, a gear case on the axle of said wheel, gearing in said case, a shaft connected with said gearing and extending beyond said gear case, a flexible joint connected with said shaft, means located adjacent said flexible joint for yieldably suspending said shaft, a dynamo, an extensible connection between said dynamo and said flexible joint, and a rotary power-transmitting shock absorbing mechanism arranged between the wheel axle and the dynamo in the means for driving the latter.

32. An axle driven car lighting system, combining a car body, a truck for supporting the same, a wheel in said truck, a dynamo suspended from the under side of the car body between the trucks thereof, resilient power-transmitting connections intervening between said dynamo and the axle of said wheel, and a rotary power-transmitting shock absorbing mechanism arranged in said connections.

33. An axle driven car lighting system, combining a car body, a supporting wheel therefor having an axle, a dynamo carried by said car body, power-transmitting extensible connections having flexible joints intervening between said axle and said dynamo, and a rotary shock absorber in said connections.

34. An axle driven car lighting system, combining a car body, a supporting wheel therefor having an axle, a flexible joint, driving means between said joint and axle embodying a rotary shock absorber, a yielding suspension for said flexible joint arranged adjacent thereto, an extensible shaft connected with said flexible joint, and a dynamo connected with said extensible shaft.

35. An axle driven car lighting system, combining a car body, a truck for supporting the same, a wheel having an axle mounted in said truck, a flexible joint arranged underneath an end member of said truck, driving means between said joint and said axle and embodying a resilient power-transmitting device, a gear case journaled on said axle and inclosing a portion of said means and having an extension projected toward said flexible joint, connections between said end member of said truck and said extension adapted to determine the position of said gear case while permitting a slight play in a plurality of different directions, an extensible horizontally arranged shaft connected with said flexible joint, and a dynamo suspended from the under side of said car body and connected with said shaft.

In testimony whereof I affix my signature, in the presence of two witnesses.

ROBERT M. DIXON.

Witnesses:
  MAXWELL GREENBERGER,
  EUGENE EBERHARDT.